US008768051B2

(12) United States Patent
Yamazaki (10) Patent No.: US 8,768,051 B2
(45) Date of Patent: Jul. 1, 2014

(54) IMAGE PROCESSING METHOD, IMAGE PROCESSING APPARATUS, AND COMPUTER-READABLE MEDIUM

(75) Inventor: Taeko Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 324 days.

(21) Appl. No.: 12/793,477

(22) Filed: Jun. 3, 2010

(65) Prior Publication Data

US 2011/0019911 A1     Jan. 27, 2011

(30) Foreign Application Priority Data

Jul. 23, 2009   (JP) ................................. 2009-172565

(51) Int. Cl.
  *G06K 9/34*   (2006.01)
(52) U.S. Cl.
  USPC ............................ 382/165; 382/299; 382/190
(58) Field of Classification Search
  None
  See application file for complete search history.

(56) References Cited

U.S. PATENT DOCUMENTS

| 5,220,620 | A  | * | 6/1993  | Nakano et al. ................. 382/167 |
| 6,389,162 | B2 | * | 5/2002  | Maeda ............................ 382/172 |
| 6,639,690 | B1 | * | 10/2003 | Yamazaki ..................... 358/1.16 |
| 6,873,436 | B1 | * | 3/2005  | Terada et al. .................. 358/1.9 |
| 2002/0176622 | A1 | * | 11/2002 | Watanabe et al. ............. 382/165 |
| 2003/0164964 | A1 | * | 9/2003 | Katsuyama .................... 358/1.9 |
| 2005/0180645 | A1 | * | 8/2005 | Hasegawa et al. ............. 382/239 |
| 2005/0195424 | A1 | * | 9/2005 | Kojima et al. ................. 358/1.15 |
| 2007/0139436 | A1 | * | 6/2007 | Yamakado et al. ............ 345/589 |
| 2008/0259359 | A1 | * | 10/2008 | Tamura ........................... 358/1.1 |
| 2009/0003693 | A1 | * | 1/2009 | Yamamoto ..................... 382/166 |
| 2010/0128058 | A1 | * | 5/2010 | Kawabata et al. ............. 345/593 |

FOREIGN PATENT DOCUMENTS

JP    2002-142128    5/2002

OTHER PUBLICATIONS

U.S. Appl. No. 12/754,355, filed Apr. 5, 2010. Applicant: Taeko Yamazaki.
U.S. Appl. No. 12/754,369, filed Apr. 5, 2010. Applicant: Taeko Yamazaki.

* cited by examiner

*Primary Examiner* — Jingge Wu
(74) *Attorney, Agent, or Firm* — Fitzpatrick, Cella, Harper & Scinto (57) ABSTRACT

An image processing apparatus comprises a division unit configured to divide an input image into a plurality of tiles of a predetermined size; a resolution conversion unit configured to convert the input image into a low-resolution image; and a determination unit configured to determine an attribute of a tile of interest from a pixel feature in the tile of interest, the tile of interest being included in the plurality of tiles obtained by the division unit dividing the input image; a generation unit configured to generate a histogram for pixels in a low-resolution tile that is obtained by converting an image of the same region as the tile of interest into a low-resolution image, the histogram indicating a relationship between each color of pixels and the number of pixels of that color.

3 Claims, 8 Drawing Sheets

EXAMPLE OF INPUT IMAGE

FIG. 3B

AFTER TILE DIVISION

FIG. 3C

AFTER SUB-TILE DIVISION

FIG. 3D

AFTER LOW-RESOLUTION CONVERSION

FIG. 5A

RESULTS OF ATTRIBUTE DETERMINATION
PERFORMED IN SUB-TILE UNITS

FIG. 5B

RESULTS OF ATTRIBUTE DETERMINATION
PERFORMED IN TILE UNITS

FIG. 6

|  | NUMBER OF REPRESENTATIVE COLORS |
|---|---|
| HALFTONE DOT | 1 |
| BACKGROUND | 1 |
| HALFTONE DOT + CHARACTER | 2 |
| BACKGROUND + CHARACTER | 2 |

IMAGE PROCESSING METHOD, IMAGE PROCESSING APPARATUS, AND COMPUTER-READABLE MEDIUM

BACKGROUND OF THE INVENTION

1. Field of the Invention

The present invention relates to an image processing method for processing a document image, an image processing apparatus, and a computer-readable medium.

2. Description of the Related Art

In recent years, progress has been made in converting information into electronic formats, and systems for scanning a paper document with a device such as a scanner and converting the document into an electronic format, instead of storing the document as-is, and for transmitting such electronic data to other devices are becoming increasingly popular.

Although electronic documents require sharpness for their character portions and uniform colors for their backgrounds in order to realize improved readability and increased compression rate, various types of noises, blurring, and irregularity can occur at the time of actually converting paper documents into electronic form.

Japanese Patent Laid-Open No. 2002-142128 has disclosed a method for, converting an input image into a low-resolution image, selecting regions of nearly uniform colors as candidates for regions of a representative color from the low-resolution image, and applying the candidates for the regions to a high-resolution image to decide a representative color and regions to be colored with the representative color, in order to simplify color-reduction processing.

Deciding a representative color in a low resolution image, as described in Japanese Patent Laid-Open No. 2002-142128, simplifies the process to decide a representative color since the number of original colors is reduced. However, in cases where a halftone dot region includes a character and the character is small in size, a minute region such as a portion corresponding to the dot of the letter "i" can be smoothed into a surrounding color at the time of low-resolution conversion and thereby can appear with a reduced frequency in the histogram. In such cases, if a representative color is decided by reference to only the frequencies in the histogram, there is the possibility of the color of the character not remaining as a representative color. That is, in such cases, the color of the character is lost at the time of quantization.

SUMMARY OF THE INVENTION

In view of the above circumstances, the present invention aims to perform accurate color-reduction processing and quantization of an image by determining an attribute of each region.

According to one aspect of the present invention, there is provided an image processing apparatus comprising: a division unit configured to divide an input image into a plurality of tiles of a predetermined size; a resolution conversion unit configured to convert the input image into a low-resolution image; a determination unit configured to determine an attribute of a tile of interest from a pixel feature in the tile of interest, the tile of interest being included in the plurality of tiles obtained by the division unit dividing the input image; a generation unit configured to generate a histogram for pixels in a low-resolution tile that is obtained by converting an image of the same region as the tile of interest into a low-resolution image, the histogram indicating a relationship between each color of pixels and the number of pixels of that color; and a color-reduction processing unit configured to perform color reduction processing on the input image based on the histogram generated by the generation unit and the attribute determined by the determination unit.

The present invention enables accurate color-reduction processing to be performed on images, thereby suppressing degradation in image quality due to quantization errors.

Further features of the present invention will become apparent from the following description of exemplary embodiments with reference to the attached drawings.

DESCRIPTION OF THE EMBODIMENTS

Hereinafter, exemplary embodiments of the present invention will be described in detail with reference to the accompanying drawings. Note that the constituent elements described in the exemplary embodiments are only illustrative and not intended to limit the scope of the present invention.

First Embodiment

Figure 1:
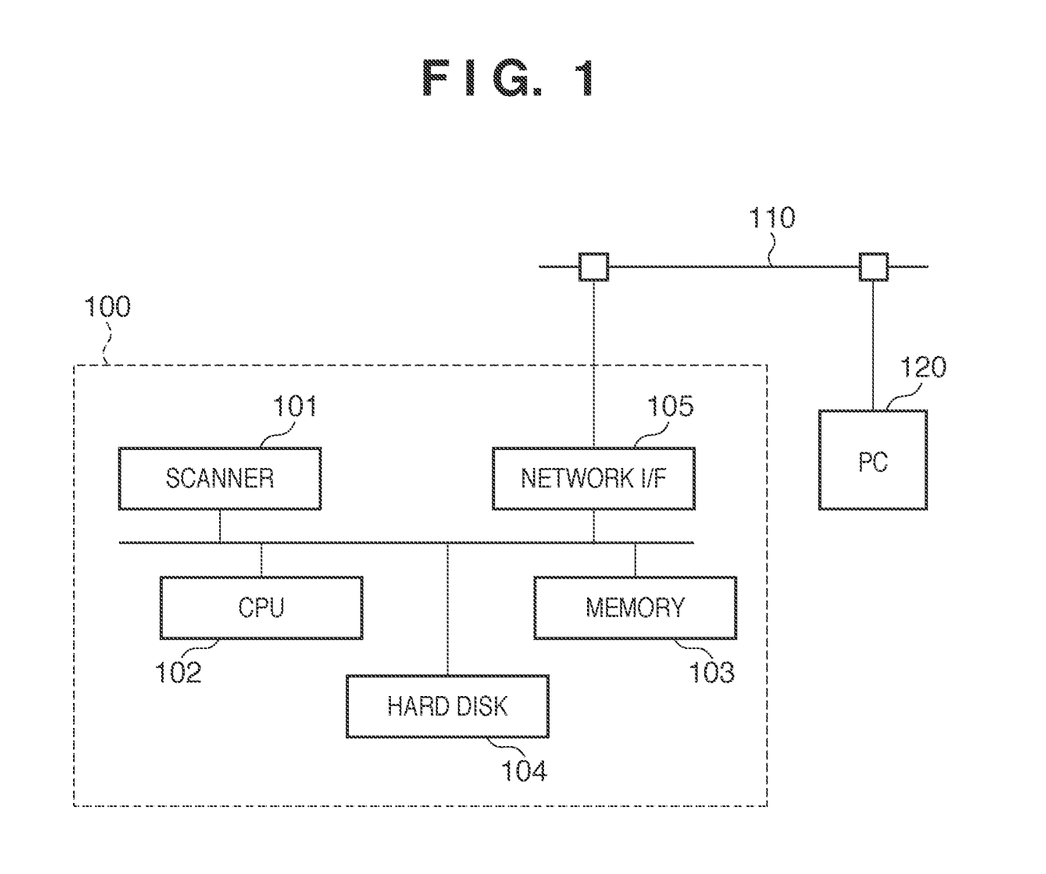
FIG. 1 is a block diagram showing a hardware configuration of an image processing system according to a first embodiment.

A hardware configuration of an image processing system according to a first embodiment of the present invention will be described with reference to the block diagram of FIG. 1. An image processing apparatus 100 includes a scanner 101 that converts written information in a scanned document into image data, and a CPU 102 that executes an image processing program. The image processing apparatus 100 also includes a memory 103 used as a work memory or a temporary storage of data at the time of execution of a program, a hard disk 104 for storing programs and data, and a network interface (I/F) 105 used to input and output data from and to external devices. A personal computer (PC) 120 is connected to the image processing apparatus 100 on a network such as a LAN 110 and receives input of data transmitted from the image processing apparatus 100.

A functional configuration of the image processing apparatus 100 according to the first embodiment is described with reference to the block diagram of FIG. 2. In the present embodiment, while the blocks shown in FIG. 2 each represent processing realized by the CPU 102 executing a program for generating an electronic document, the present invention is not limited thereto. In other words, a part of or the entire processing included in FIG. 2 may be implemented by an electric circuit and in that case, a part of or the entire invention may be configured by a circuit as a concrete example of hardware.

Figure 2:
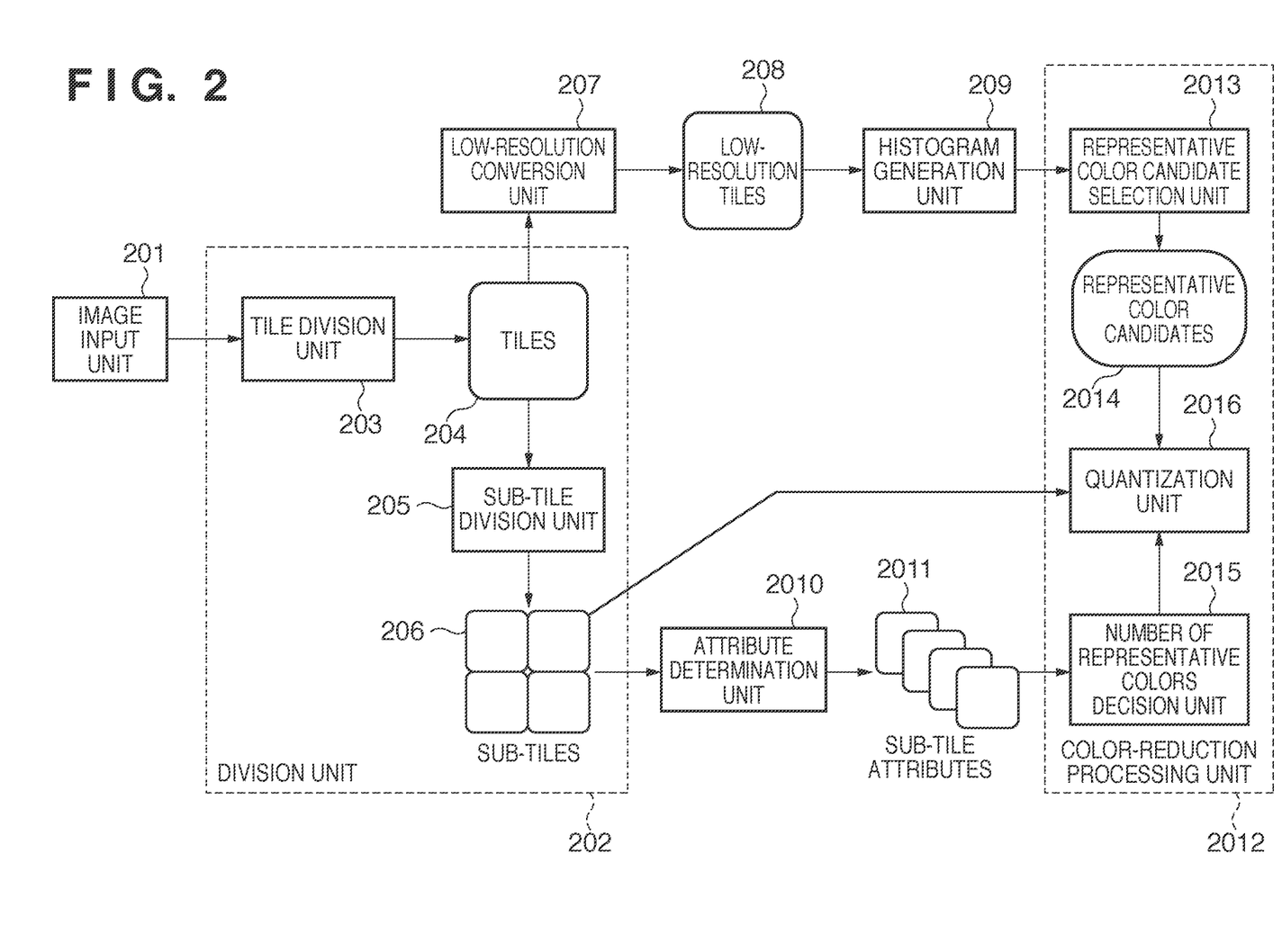
FIG. 2 is a functional configuration diagram of an image processing apparatus according to the first embodiment.
Figure 3A:
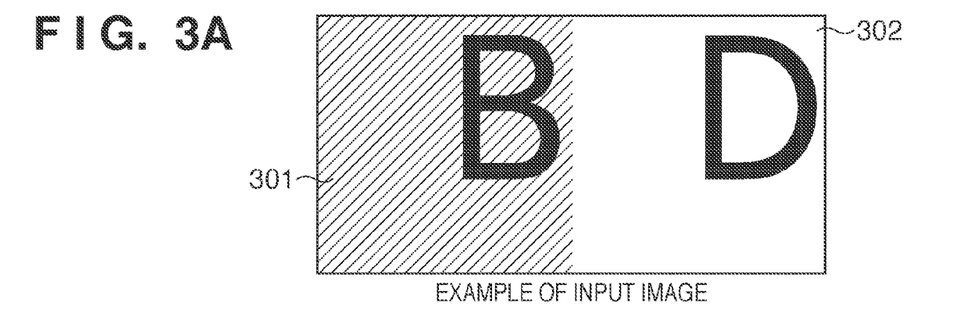
FIGS. 3A to 3D illustrate concrete examples of image division processing.
Figure 3B:
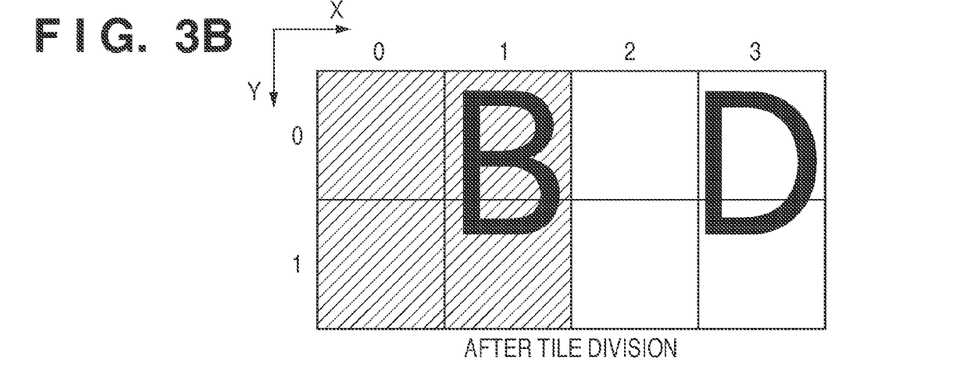
Figure 3C:
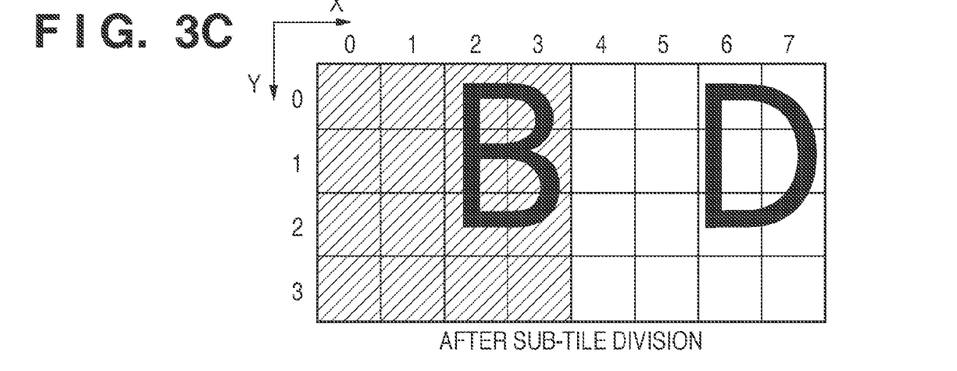

In FIG. 2, an image input unit 201 is an interface used to input image data from the scanner 101. FIG. 3A shows a part of an input image that has been input from the image input unit 201. Assume that a region 301 is a halftone dot region (with a halftone dot background) and a region 302 is a background region (with a background of a single color), the regions respectively including letters B and D. The image input unit 201 transmits input image data to a division unit 202. The division unit 202 divides image data that was sent into multiple tiles of a predetermined size (for example, 64-by-64-pixel tiles). The division unit 202 includes a tile division unit 203 and a sub-tile division unit 205. The tile division unit 203 divides image data that was sent into multiple tiles 204, each corresponding to a predetermined image region. FIG. 3B shows an example in which the input image in FIG. 3A is divided into tiles. The sub-tile division unit 205 further divides each of the tiles 204 into smaller sub-tiles (for example, 32-by-32 pixel sub-tiles). FIG. 3C shows an example in which each of the tiles in FIG. 3B is divided into sub-tiles.

Figure 3D:
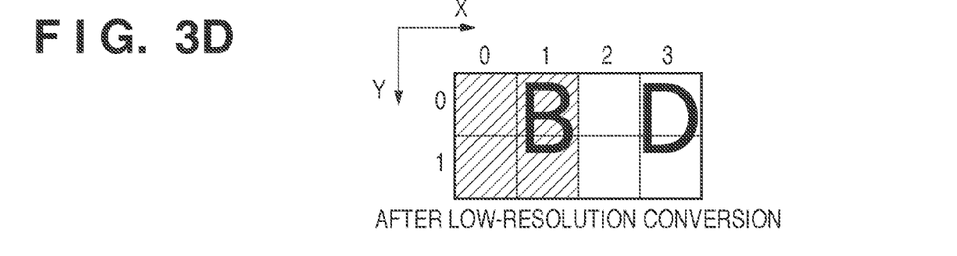

The low-resolution conversion unit 207 in FIG. 2 performs low-resolution conversion processing on one (tile of interest) of the tiles 204 obtained by the division by the tile division unit 203 so as to generate a low-resolution tile 208. For example, a 64-by-64 pixel tile 204 is converted into a low-resolution tile that is a 32-by-32 pixel low-resolution image. In the present embodiment, while the low-resolution conversion is performed by a method using an average value of peripheral pixels by way of example, the present invention is not limited to that conversion method. FIG. 3D shows an example of low-resolution tiles 208 obtained by performing low-resolution conversion processing on the tiles 204 shown in FIG. 3B. A histogram generation unit 209 generates a histogram that indicates colors in a low-resolution tile 208 generated by the low-resolution conversion unit 207 and the numbers (frequencies) of pixels appearing in those colors. In other words, a histogram indicating the relationship between each color of pixels and the number of pixels of that color is generated for pixels in a low-resolution tile that is obtained by converting an image of the same region as the tile of interest into a low-resolution image.

Figure 4A:
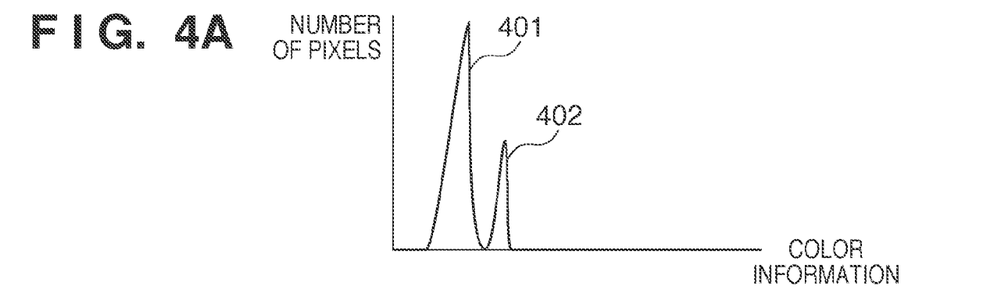
FIGS. 4A to 4D show examples of histogram generated from low-resolution tiles.
Figure 4B:
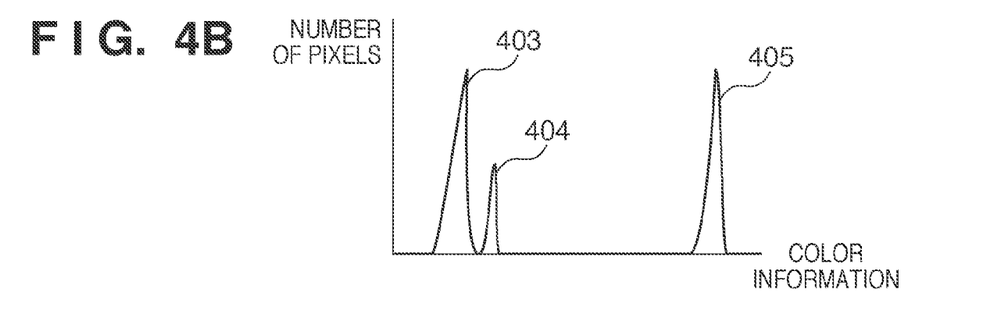

Referring to FIGS. 4A to 4D that show examples of histogram generated from low-resolution tiles, FIG. 4A shows a histogram generated from a low-resolution tile at tile coordinates (x, y)=(0, 1) in FIG. 3D. The low-resolution tile at (x, y)=(0, 1) in FIG. 3D is a halftone dot region. Thus, colors 401 and 402 constituting halftone dots appear in the histogram. FIG. 4B is a histogram generated from a low-resolution tile at tile coordinates (x, y)=(1, 1) in FIG. 3D. Since the low-resolution tile at (x, y)=(1, 1) includes both halftone dots and a character (part of the letter "B"), color information 403 and color information 404 that constitute halftone dots and color information 405 that indicates the color of the letter appear in the histogram.

Figure 4C:
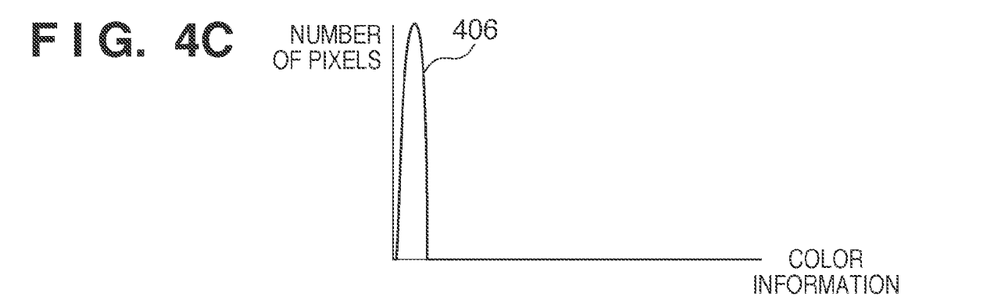
Figure 4D:
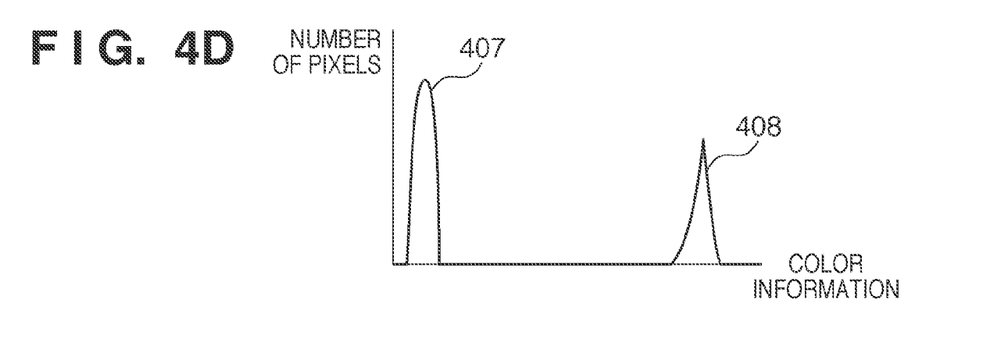

FIG. 4C shows a histogram generated from a low-resolution tile at (x, y)=(2, 1) in FIG. 3D. Since the low-resolution tile at (x, y)=(2, 1) is a solid-colored background (of a single color), only background color information 406 appears in the histogram. FIG. 4D shows a histogram for a low-resolution tile at (x, y)=(3, 1) in FIG. 3D. Since the low-resolution tile at (x, y)=(3, 1) includes a letter on the background, color information 407 that indicates the background and color information 408 that indicates the color of the letter appear in the histogram.

An attribute determination unit 2010 determines the attribute of each sub-tile 206 from features of the sub-tile. Sub-tile attributes include "halftone dot", "background", "halftone dot+character", and "background+character". A known method for determining halftone dots and characters is used to determine the attribute. In the present embodiment, while edges are extracted from each sub-tile with the application of, for example, a Sobel filter and the attribute of the sub-tile is determined from extracted edge features, the present invention is not limited thereto.

Criteria for the determination using edge features are as follows.

edges that are in dispersed locations in the sub-tile→"halftone dot"

edges that are very small in number in the sub-tile→"background"

edges that are continuous in the sub-tile→"background+character"

edges that are in dispersed locations and continuous in the sub-tile→"halftone dot+character"

Figure 5A:
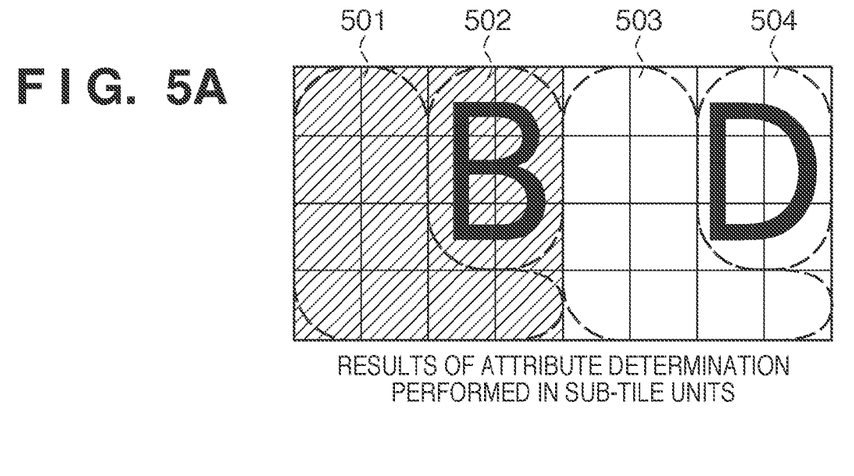
FIGS. 5A and 5B show examples of the results of attribute determination.

The attribute determination unit 2010 performs the determination in sub-tile units. FIG. 5A shows sub-tile attributes 2011 determined for the sub-tiles in FIG. 3C. In FIG. 5A, the attribute of sub-tiles included in a region 501 is "halftone dot". The attribute of sub-tiles included in a region 502 is "halftone dot+character". The attribute of sub-tiles included in a region 503 is "background". The attribute of sub-tiles included in a region 504 is "background+character". A color-reduction processing unit 2012 decides a representative color for each sub-tile, using the histogram generated by the histogram generation unit 209 and the sub-tile attribute 2011 determined by the attribute determination unit 2010, and performs quantization. The color-reduction processing unit 2012 includes a representative color candidate selection unit 2013, a number of representative colors decision unit 2015, and a quantization unit 2016.

The representative color candidate selection unit 2013 selects colors to be candidates for a representative color in each tile, from the histogram generated by the histogram generation unit 209. For example, in the present embodiment, color information that has a higher frequency value than a predetermined threshold value in the histogram is selected as a representative color candidate. However, the present invention is not limited thereto, and any other common method may be used as a method for determining a representative color from feature quantities in the histogram.

Figure 6:
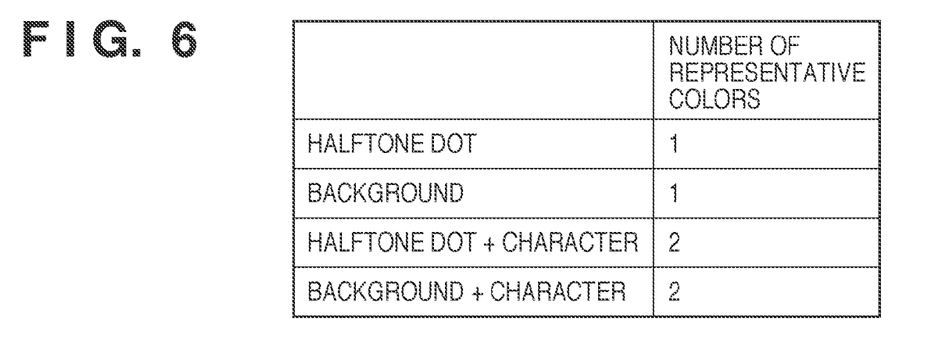
FIG. 6 shows a list of the number of colors that can be specified for each attribute.

In the case of the histogram shown in FIG. 4A, the two colors 401 and 402 are decided as representative color candidates. Similarly, in the case of FIG. 4B, the colors 403, 404, and 405 are decided as representative color candidates. Also, in the case of FIG. 4C, the color 406 is decided as a representative color candidate, and in the case of FIG. 4D, the two colors 407 and 408 are decided as representative color candidates. Then, the number of representative colors decision unit 2015 decides the number of representative colors that is used to quantize a sub-tile, based on the sub-tile attribute. A list of the numbers of representative colors decided for each sub-tile attribute is shown in FIG. 6. Specifically, the number of representative colors for the sub-tile attribute of "halftone dot" is one, the number for "background" is one, the number for "background+character" is two, and the number for "halftone dot+character" is two.

The quantization unit 2016 decides a representative color for each sub-tile from among the representative color candidates selected by the representative color candidate selection unit 2013, based on the number of colors decided by the number of representative colors decision unit 2015, and actually performs quantization based on the representative color.

The sub-tile attributes shown in FIG. 5A and the number of colors used to quantize each sub-tile are described using specific examples. The attribute of a sub-tile at (x, y)=(2, 2) in FIG. 3C is "halftone dot+character" as shown in FIG. 5A. Since the low-resolution tile corresponding to that sub-tile is a tile at (x, y)=(1, 1) in FIG. 3D and its histogram was generated as shown in FIG. 4B, the three colors 403, 404, and 405 are decided as representative color candidates. In the case of the sub-tile attribute of "halftone dot+character", since the number of representative colors to be selected is two by reference to the list of the numbers of colors in FIG. 6, two of the three representative color candidates 403, 404, and 405 in FIG. 4B are selected as representative colors being used to quantize pixels in the sub-tile at (x, y)=(2, 2) in FIG. 3C.

Meanwhile, the attribute of the sub-tile at (x, y)=(2, 3) in FIG. 3C that corresponds to the low-resolution tile at (x, y)=(1, 1) in FIG. 3D is "halftone dot". In the case of the sub-tile attribute of "halftone dot", since the number of representative colors to be selected is one by reference to the list of the numbers of colors in FIG. 6, one of the representative color candidates 403, 404, and 405 in FIG. 4B is selected as a representative color being used to quantize the sub-tile at (x, y)=(2, 3) in FIG. 3C.

The quantization unit 2016 decides a representative color that is actually used to quantize pixels included in each sub-tile from among the selected representative color candidates, and performs quantization. As a method for deciding a quantization color, a common method at the time of the application of the present invention may be used. For example, in cases where the number of representative colors is one, a color that appears with the highest frequency in the histogram may be decided as a quantization color. As another alternative, an optimum quantization color may be decided from a color difference between color information about pixels included in a sub-tile to be quantized and representative color candidates.

In some cases, multiple representative color candidates that are obtained from a halftone dot region may appear in the histogram of a low-resolution tile (low-resolution image), such as the representative color candidates 401 and 402 in FIG. 4A and the representative color candidates 403 and 404 in FIG. 4B. Such representative color candidates obtained from a halftone dot region appear as similar colors (their color information has a similar peak position in the histogram) since they were obtained from a low-resolution image. In the case of the sub-tile attribute of "halftone dot+character", the number of colors used for quantization is two as described above. In this case, since the representative color candidates 403 and 404 have similar color information as shown in FIG. 4B, the representative color candidates 403 and 404 are considered to be colors included in the halftone dot portions. Therefore, the representative color candidate 403 having a higher frequency between them may be decided as a quantization color used for halftone dot portions, and the representative color candidate 405 may be decided as a quantization color used for letter portions.

As described above, in the first embodiment of the present invention, low-resolution tile units are used to generate a histogram and select representative color candidates, and high-resolution sub-tile units are used to determine tile attributes and decide the number of colors used for quantization, so that quantization processing is performed based on the representative color candidates and the number of colors used for quantization. Generating histograms in low-resolution tile units in this way enables the speeding up of processing and allows the processing to be less affected by scan noise and halftone dots. In addition, since the number of representative colors is decided in high-resolution sub-tile units, even if a sub-tile includes a minute region such as a part of a letter, the attribute of the sub-tile can be determined as either "halftone dot+character" or "background+character". Based on this attribute, the number of colors used for quantization is decided as two, which prevents a loss of a representative color in the letter portion.

Second Embodiment

In a second embodiment of the present invention, the same tile units are used to select representative color candidates, to determine tile attributes, and to perform quantization, and a representative color used for quantization (quantization color) is decided after the number of representative colors has been decided in advance. This prevents irregularities in quantization results due to the application of a different representative color at the time of quantization to multiple tiles that have the same tile attribute and thus are to be colored with the same representative color.

Figure 7:
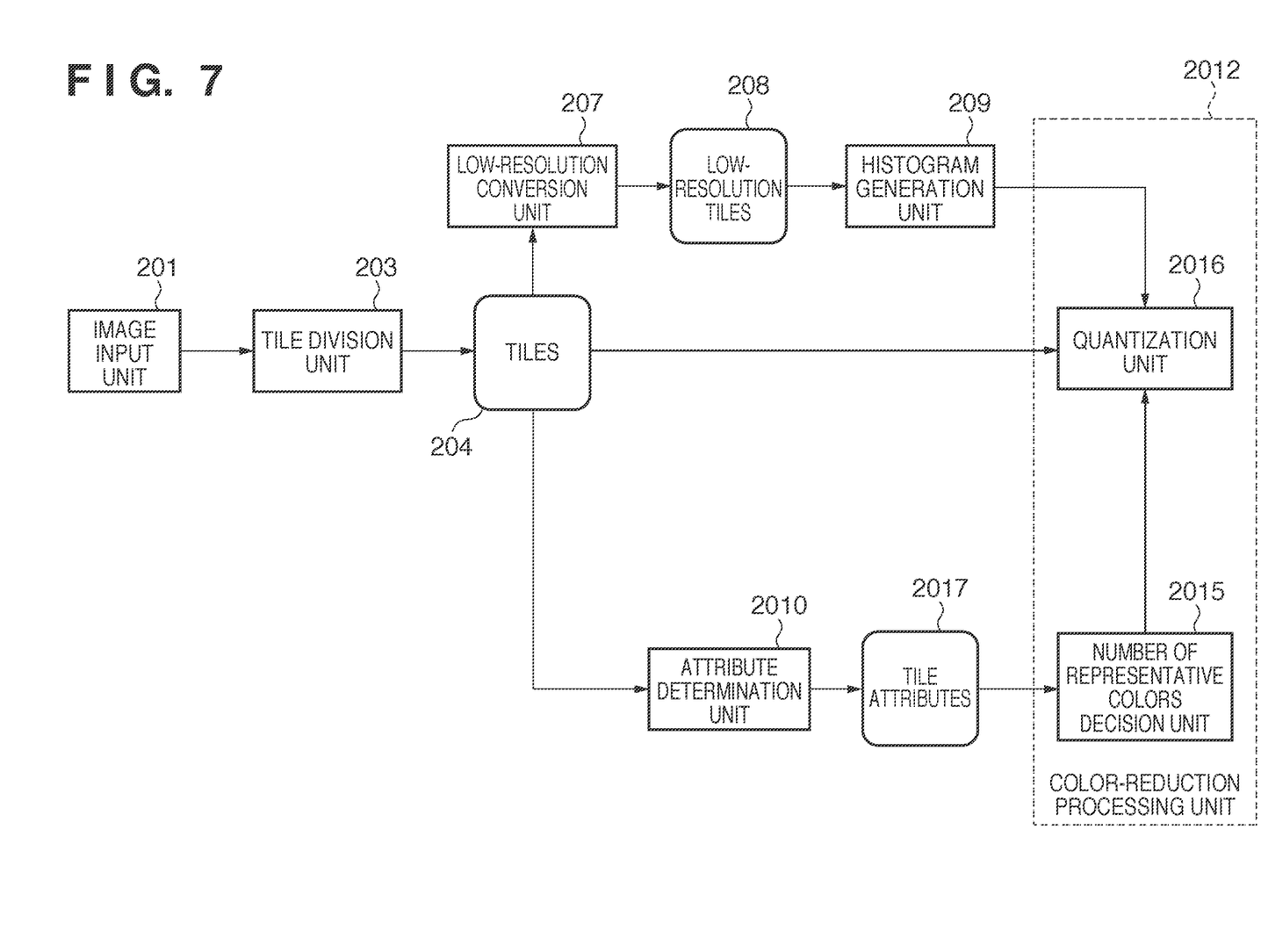
FIG. 7 is a functional configuration diagram of an image processing apparatus according to a second embodiment.

FIG. 7 shows a functional configuration according to the second embodiment. Note that the same components and processes as those in the first embodiment are denoted by the same reference numerals and have not been described herein. In FIG. 7, in the absence of the sub-tile division unit 205 in FIG. 2, the attribute determination unit 2010 directly determines the attribute of the tile of interest (tile 204) from pixel features in the tile of interest and derives a tile attribute 2017.

Figure 5B:
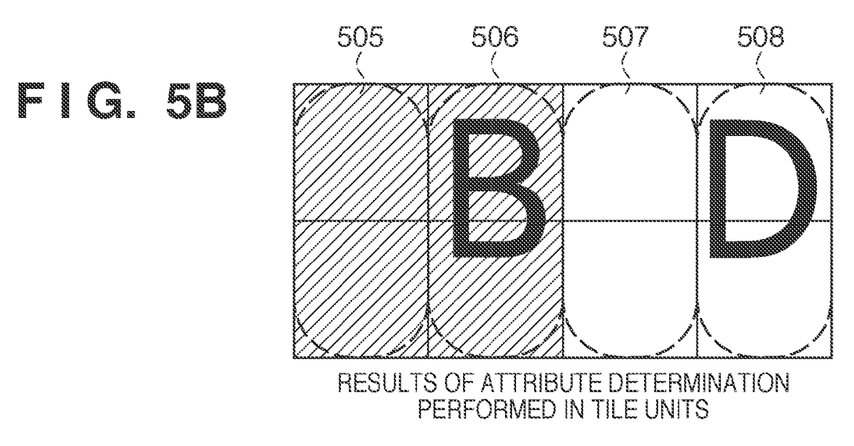

A number of representative colors decision unit 2015 selects the number of representative colors according to the tile attribute 2017 derived as a result of the determination performed by the attribute determination unit 2010. The attribute of tiles included in a region 505 in FIG. 5B is "halftone dot". The attribute of tiles included in a region 506 is "halftone dot+character". The attribute of tiles included in a region 507 is "background". The attribute of tiles included in a region 508 is "background+character".

A quantization unit 2016 in FIG. 7 extracts the same number of colors as the number of representative colors decided by the number of representative colors decision unit 2015 from the histogram and decides a representative color. Referring to the tile attributes shown in FIG. 5B, since the attribute of the tile at (x, y)=(0, 1) in FIG. 3B is "halftone dot", the number of representative colors decision unit 2015 decides the number of representative colors as one by reference to the list of the numbers of colors in FIG. 6.

By reference to a corresponding histogram (FIG. 4A) and the number of representative colors, the quantization unit 2016 selects a representative color used to quantize the tile of interest (for example, the tile at (x, y)=(0, 1)) and performs quantization. As a method for deciding a representative color, a color that appears with a high frequency may be selected, or a representative color may be decided by reference to a color difference between color information about pixels in an image to be quantized and a representative color.

In the case of another tile of interest (for example, the tile at (x, y)=(1, 1)) that has an attribute of "halftone dot+character", the number of representative colors decision unit 2015 selects the number of colors as two. The quantization unit 2016 selects two representative colors from a corresponding histogram (FIG. 4B) and performs quantization. As a method for selecting a representative color, since two colors are selected, two colors that have color information in sufficiently distant locations in the histogram and that appear with high frequencies in the histogram may be selected.

As described above, in the present embodiment, the same tile size is used to generate histograms and to determine tile attributes. Using the same tile size to determine a representative color, to determine an attribute, and to perform quantization and deciding a representative color by reference to the histogram after the number of representative colors has been decided in advance prevents color heterogeneity at the time of quantization.

Third Embodiment

While halftone dots and backgrounds often occupy a large area in an image, characters occupy a small area in many cases. In a third embodiment of the present invention, tile attributes are determined once in sub-tile units, and then quantization units used to decide the number of representative colors and perform quantization are switched depending on the combination of the attributes of sub-tiles that correspond to a low-resolution tile.

Figure 8:
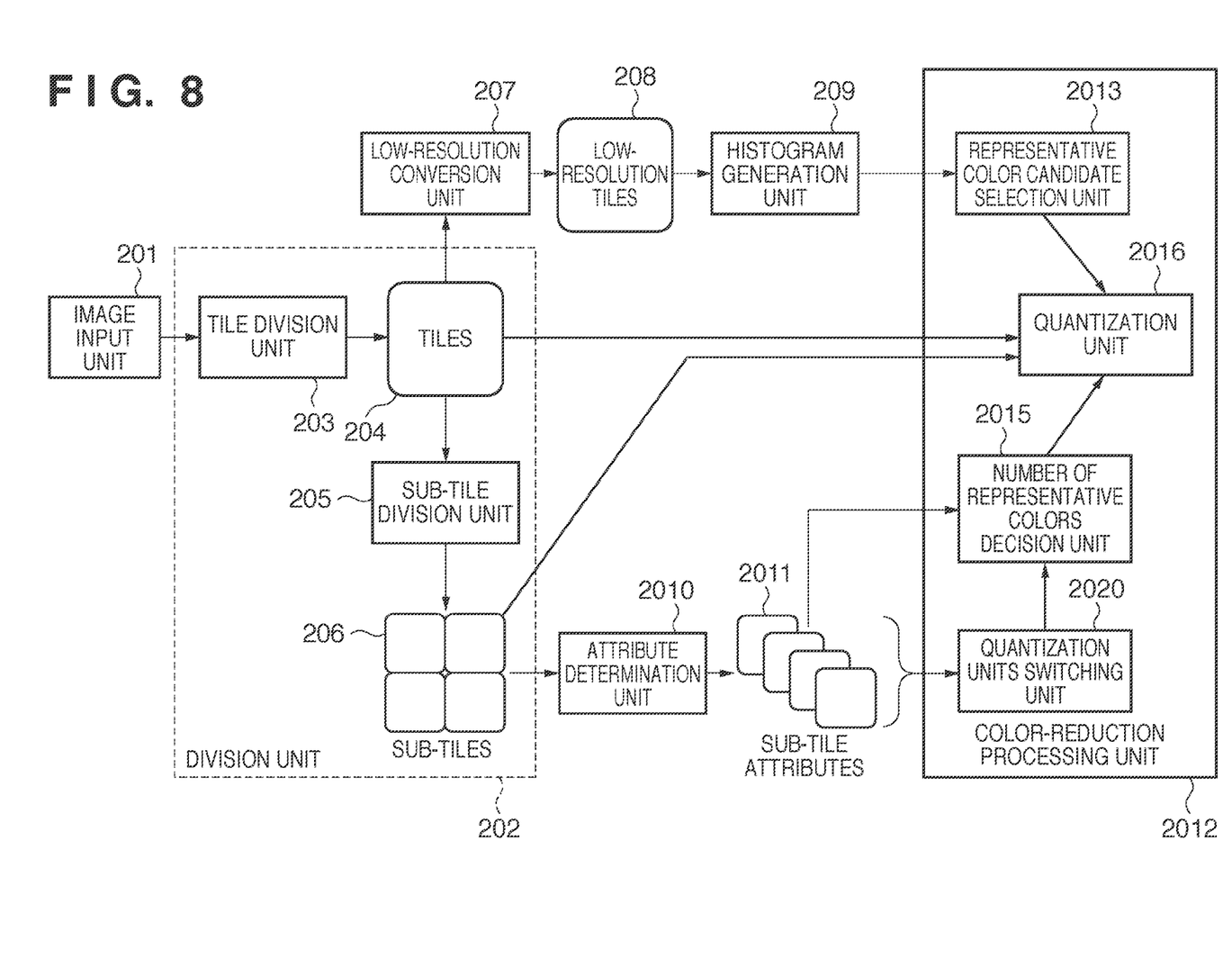
FIG. 8 is a functional configuration diagram of an image processing apparatus according to a third embodiment.

FIG. 8 is a block diagram showing a functional configuration according to the third embodiment. In the present embodiment, in addition to the configuration of the first embodiment, a color-reduction processing unit 2012 is provided with a quantization units switching unit 2020. Note that the same components and processes as those in the first embodiment are denoted by the same reference numerals and have not been described herein.

Figure 9:
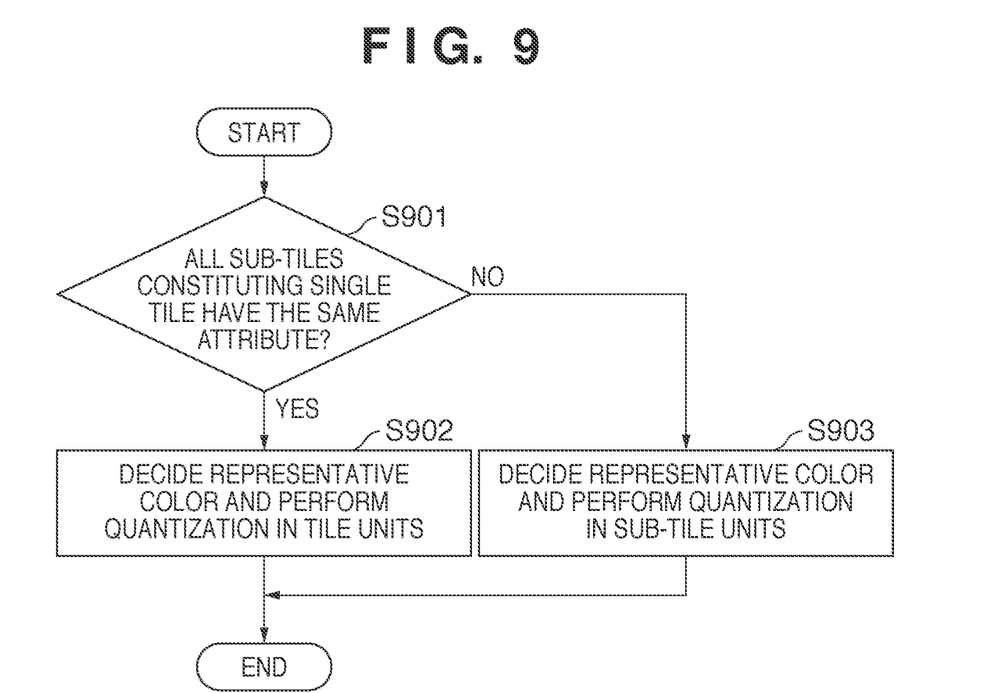
FIG. 9 is a flowchart showing detailed contents of processing performed by a quantization units switching unit according to the third embodiment.

Detailed contents of processing performed by the quantization units switching unit 2020 will be described with reference to the flowchart of FIG. 9. In 5901, it is determined whether or not all of multiple sub-tiles that correspond to a low-resolution tile for which a histogram was generated have the same tile attribute. Specifically, in the configuration in FIG. 8, it is determined whether or not all four sub-tiles 206 that correspond to a tile 204 (low-resolution tile 208) have the same attribute 2011. If all of the corresponding sub-tiles have the same tile attribute, the processing proceeds to 5902, and if not, the processing proceeds to 5903. In 5902, representative color determination and quantization are performed in tile units. In 5903, representative color determination and quantization are performed in sub-tile units.

Taking specific examples, in the case of a tile at (x, y)=(0, 1) in FIG. 3B, its corresponding sub-tiles are at (x, y)=(0, 2), at (x, y)=(0, 3), at (x, y)=(1, 2), and at (x, y)=(1, 3) in FIG. 3C. As can be seen by reference to FIG. 5A, the attributes of those sub-tiles are all "halftone dot". Accordingly, representative color determination and quantization are performed in tile units and accordingly all the four sub-tiles are colored with the same representative color.

Meanwhile, in the case of a tile at (x, y)=(1, 1) in FIG. 3B, its corresponding sub-tiles are at (x, y)=(2, 2), at (x, y)=(2, 3), at (x, y)=(3, 2), and at (x, y)=(3, 3) in FIG. 3C. Since the attribute of the tiles at (2, 2) and (3, 2) is "halftone dot+ character" and the attribute of the tiles at (2, 3) and (3, 3) is "halftone dot", not all the attributes of the corresponding sub-tiles are the same. Thus, sub-tile units are used for representative color determination and quantization, in which case the number of representative colors for the tiles at (2, 2) and (3, 2) in FIG. 3C is two and the number of representative colors for the tiles at (2, 3) and (3, 3) is one, so representative color determination and quantization are performed in sub-tile units.

As described above, in the present embodiment, a unit area used to decide the number of representative colors and perform quantization is switched depending on the combination of the attributes of sub-tiles corresponding to a low-resolution tile. In this case, it is possible both to prevent color heterogeneity in backgrounds and halftone dots that occupy a large area in an image and to perform quantization of a minute region of a character portion.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-172565, filed Jul. 23, 2009, which is hereby incorporated by reference herein in its entirety.

What is claimed is:

1. An image processing apparatus comprising:
    A first division unit configured to divide an input image into a plurality of tiles of a predetermined size;
    a second division unit configured to divide a tile of interest included in the plurality of tiles into a plurality of sub-tiles;
    an edge extraction unit configured to extract edges of each sub-tile;
    a determination unit configured to determine an attribute each of the sub-tiles based on a continuity, distribution, and a number of the extracted edges;
    a first decision unit configured to decide a total number of representative colors of each of the sub-tiles based on the determined attribute of each of the sub-tiles;
    a resolution conversion unit configured to convert the tile of interest into a lower-resolution tile;
    a generation unit configured to generate a histogram for pixels in the lower-resolution tile, the histogram indicating a relationship between each color of pixels and the number of pixels of that color in the lower-resolution tile;
    a second decision unit configured to decide the representative colors of each of the sub-tiles based on the generated histogram and the decided total number of representative colors in the sub-tile; and
    a conversion unit configured to convert the tile of interest into a tile in which colors of pixels comprise the decided representative colors.

2. An image processing method comprising:
    dividing an input image into a plurality of tiles of a predetermined size;
    dividing a tile of interest included in the plurality of tiles into a plurality of sub-tiles;
    extracting edges of each sub-tile;
    determining an attribute of each of the sub-tiles based on a continuity, distribution, and a number of the extracted edges
    deciding a total number of representative colors of each of the sub-tiles based on the determined attribute of each of the sub-tiles;
    converting the tile of interest into a lower-resolution tile;
    generating a histogram for pixels in the lower-resolution tile, the histogram indicating a relationship between each color of pixels and the number of pixels of that color in the lower-resolution tile;

deciding the representative colors of each of the sub-tiles based on the generated histogram and the decided total number of representative colors in the sub-tile; and converting the tile of interest into a tile in which colors of pixels comprise the decided representative colors.

3. A non-transitory computer-readable storage medium storing a program for causing a computer to function as:
- a first division unit configured to divide an input image into a plurality of tiles of a predetermined size;
- a second division unit configured to divide a tile of interest included in the plurality of tiles into a plurality of sub-tiles;
- an edge extraction unit configured to extract edges of each sub-tile;
- a determination unit configured to determine an attribute of each of the sub-tiles based on a continuity, distribution, and a number of the extracted edges;
- a first decision unit configured to decide a total number of representative colors of each of sub-tiles based on the determined attribute of each of the sub-tiles;
- a resolution conversion unit configured to convert the tile of interest into a lower-resolution tile;
- a generation unit configured to generate a histogram for pixels in the lower-resolution tile, the histogram indicating a relationship between each color of pixels and the number of pixels of that color in the lower-resolution tile;
- a second decision unit configured to decide the representative colors of each of the sub-tiles based on the generated histogram and the decided total number of representative colors in the sub-tile tile; and
- a conversion unit configured to convert the tile of interest into a tile in which colors of pixels comprise the decided representative colors.

* * * * *